No. 774,706. PATENTED NOV. 8, 1904.
H. A. SMITH.
WHEEL FENDER FOR SULKY OR GANG PLOWS.
APPLICATION FILED NOV. 10, 1903.
NO MODEL.
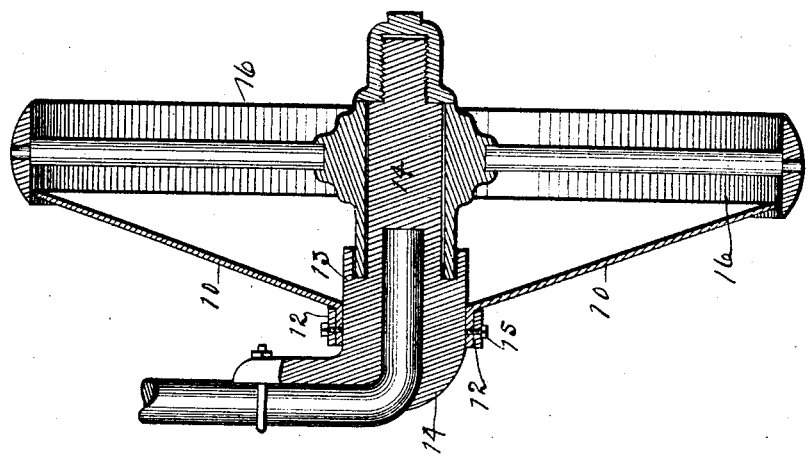
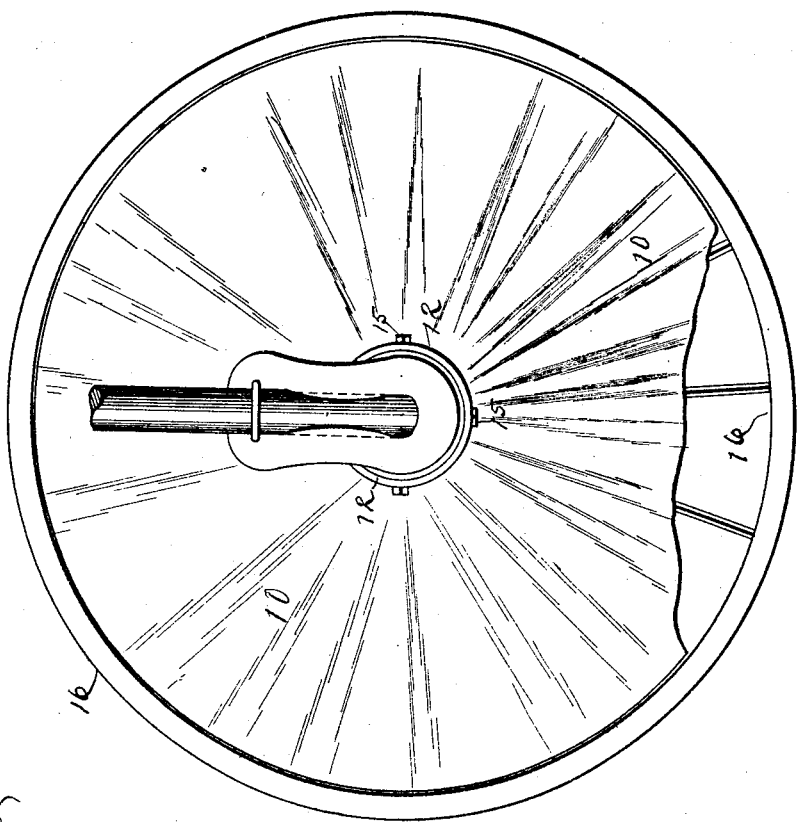

No. 774,706. Patented November 8, 1904.

UNITED STATES PATENT OFFICE.

HIRAM AUGUSTUS SMITH, OF GILLETT GROVE, IOWA.

WHEEL-FENDER FOR SULKY OR GANG PLOWS.

SPECIFICATION forming part of Letters Patent No. 774,706, dated November 8, 1904.

Application filed November 10, 1903. Serial No. 180,619. (No model.)

*To all whom it may concern:*

Be it known that I, HIRAM AUGUSTUS SMITH, a citizen of the United States, residing at Gillett Grove, in the county of Clay and State of Iowa, have invented a new and useful Wheel-Fender for Sulky or Gang Plows, of which the following is a specification.

My object is to prevent the annoyances, labor, and delay incident to grass, weeds, and trash of different kinds gathering and adhering to the rear wheel of a sulky or gang plow that runs on the unplowed ground as the plow is advanced in a field.

It frequently occurs, especially when the grass and ground is wet, that vegetable matter, grass, weeds, roots, &c., come in contact with the spokes of the wheel and the hub and are wrapped on the hub and with mud that sticks thereto clog the wheel and makes it necessary to stop the plow and by manual labor remove the obstructive matter, and by the use of my invention such hindrance to the operation of the plow is automatically overcome.

My invention consists in the construction and combination of a fender to protect the hub and spokes of a wheel from contact of obstructive matter, as hereinafter set forth, pointed out in my claim, and illustrated in the accompanying drawings, in which—

Figure 1 is a side view of the fender and wheel, showing it in position on a wheel as required for practical use. Fig. 2 is a sectional view that shows the form and position of the fender relative to the axle and the wheel that is detachably connected with the axle.

The numeral 10 designates the fender in the form of a concavo disk adapted to extend from the hub of the wheel to the rim, as required to cover the spokes of the wheel. It is preferably made of sheet metal and must correspond in diameter with the size of the wheel to which it is to be applied. At its center it is provided with a circular opening and a flange or collar 12, adapted in size to fit on a sand-box 13, having an integral axle 14, and is detachably fastened on said sand-boxing by means of one or more set-screws 15, as required to retain the fender 10 stationary, while the wheel 16 is free to revolve on the axle.

In practical use grass, weeds, &c., that come in contact with the convex face of the fender will be deflected thereby and thrown from the wheel, and as the fender is stationary they will not wrap on its collar, but fall to the ground as the wheel is rotated on the axle that is integral with the sand-box and advanced on the ground.

Having thus described the purpose of my invention, its construction, application, and operation, the practical utility thereof will be readily understood by farmers and persons familiar with the art to which it pertains; and

What I claim as new, and desire to secure by Letters Patent, is—

In a sulky-plow, the combination of a concavo-convex disk, having a central opening and a flange adapted to serve as a collar, fixed to a sand-box, and a sand-box having an integral axle, as shown and described to retain the disk stationary relative to a traction-wheel rotatable on said axle, for the purposes stated.

HIRAM AUGUSTUS SMITH.

Witnesses:
A. W. DUBOIS,
R. S. MOORE.